A. W. MELLOWES

May 30, 1933. MECHANICAL REFRIGERATING EVAPORATOR Re. 18,851

Original Filed Feb. 28, 1921

Inventor:
Alfred W. Mellowes,
By: Edwin S. Flower, Jr.
Attorney:

Reissued May 30, 1933

Re. 18,851

UNITED STATES PATENT OFFICE

ALFRED W. MELLOWES, OF MILWAUKEE, WISCONSIN, ASSIGNOR OF ONE-HALF TO EDWIN B. H. TOWER, JR., OF MILWAUKEE, WISCONSIN

MECHANICAL REFRIGERATING EVAPORATOR

Original application filed February 28, 1921, Serial No. 448,412, Patent No. 1,833,846, dated November 24, 1931. Divided and application filed November 23, 1931, Serial No. 576,905, Patent No. 1,847,057, dated February 23, 1932. Application for reissue filed March 3, 1933. Serial No. 660,541.

The invention relates to a mechanical refrigerating evaporator.

The present application is for a reissue of Letters Patent No. 1,847,057, February 23, 1932, issued on a division of application Serial No. 448,412, filed February 28, 1921, now Letters Patent No. 1,833,846, issued November 24, 1931.

The mechanical refrigerating evaporator to which the invention applies in particular is of the type which has liquid refrigerant delivered thereto from a condenser and vaporized refrigerant returned therefrom to a compressor.

The liquid refrigerant which is delivered to the evaporator from the compressor has oil commingled therewith.

The invention has as an object to provide a mechanical refrigerating evaporator with an oil separator in which oil is separated from liquid refrigerant by flotation to the surface thereof and then drawn from the separating reservoir with vaporized refrigerant and returned therewith to the compressor.

Another object is to provide a mechanical refrigerating evaporator with an oil separating reservoir which will accumulate vaporized refrigerant above the liquid refrigerant and keep liquid refrigerant from being returned to the compressor.

Another object is to provide a mechanical refrigerating evaporator with an oil separating reservoir from which only oil and vaporized refrigerant will be drawn and returned to the compressor.

Another object is to provide a mechanical refrigerating evaporator with an oil separating reservoir in which the liquid refrigerant will be kept from rising above a given level therein.

According to this invention as it is embodied in practice, the evaporator is provided with a liquid refrigerant container to absorb heat by vaporization of liquid refrigerant therein and an oil separating reservoir arranged above the liquid refrigerant container in communication therewith to accumulate vaporized refrigerant therefrom and to contain liquid refrigerant and allow the oil commingled therewith to separate therefrom by flotation to the surface thereof and having the liquid refrigerant therein limited in quantity to keep it from rising above a given level.

The separating reservoir is provided with a discharge pipe or other means arranged to draw therefrom and return to the compressor the separated oil and vaporized refrigerant and to keep liquid refrigerant from being drawn from the separating reservoir with the separated oil and vaporized refrigerant.

The separating reservoir is ordinarily provided with means arranged as a part thereof to limit in quantity the liquid refrigerant therein to keep it from rising above a given level.

The evaporator which is illustrated in the accompanying drawing exemplifies the invention and the views thereof are as follows.

Figure 2:
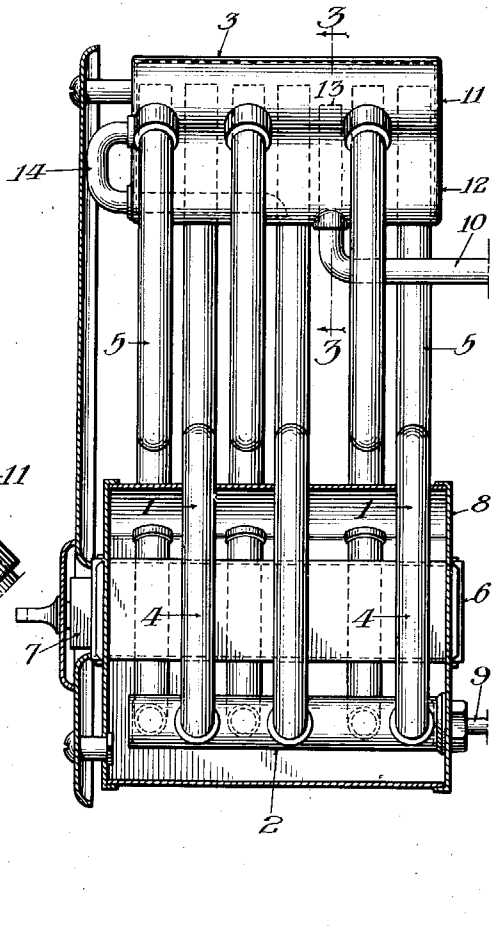
Fig. 2 is a side elevation in section on the line 2—2, Fig. 1.
Figure 3:
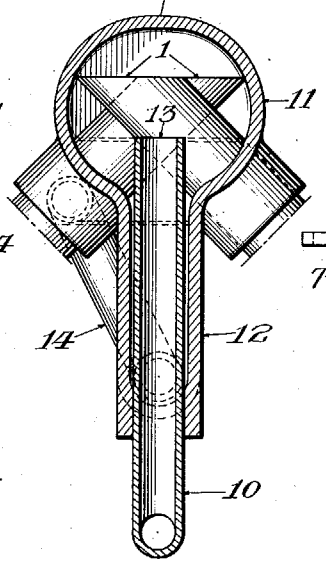
Fig. 3 is an enlarged front sectional elevation of the oil separator.
Figure 1:
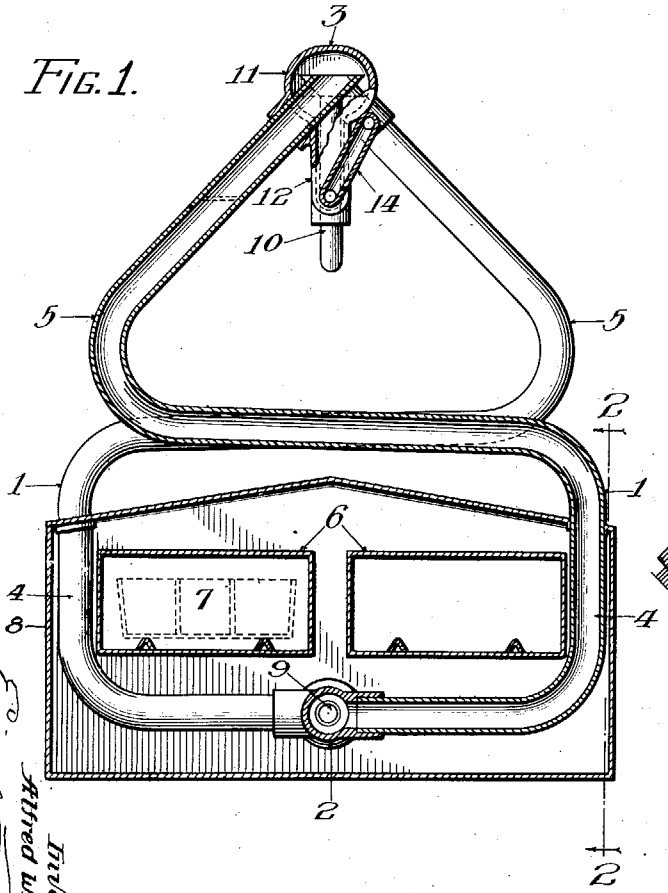
Fig. 1 is a front sectional elevation.

The oil separator is shown and described as applied to an evaporator of the type described and claimed in the aforesaid Letters Patent No. 1,833,946, issued November 24, 1931, but that particular evaporator with the oil separator combined therewith is not claimed herein.

The evaporator is provided with a liquid refrigerant container which is formed in general by multiple refrigerant ducts or tubes 1 which are arranged in two opposite groups.

The refrigerant tubes are connected at the lower end in multiple to a refrigerant supply header manifold 2 and at the upper end in multiple to a refrigerant discharge header or manifold 3.

The refrigerant discharge manifold is constructed to provide an oil separator in which oil commingled with liquid refrigerant is separated therefrom and then returned to the compressor with vaporized refrigerant.

The multiple refrigerant tubes are arranged to provide at the lower part thereof multiple freezing ducts or tubes 4 upon both lateral sides of a freezing space and at the upper part thereof multiple cooling ducts or tubes 5 in direct contact with the ambient air in a cooling space within a cooling or refrigerating compartment.

The freezing space has arranged therein a freezing compartment 6 which has two chambers, each of which is open at its front end to receive endwise a removable ice tray 7.

The freezing tubes and freezing compartment are enclosed within a tank 8 which contains brine or other suitable liquid to increase the thermal conductivity between the freezing tubes and freezing compartment, but other expedients may be employed to attain the same end.

The freezing compartment is carried by the tank, and the tank has its top attached to the refrigerant tubes, but other ways may be employed to support the freezing compartment within the freezing space.

The air cooling tubes are reflexed above the freezing compartment to increase the heat absorbing surface thereof within a given space.

The refrigerant tubes may be increased in number and the shape thereof varied to obtain sufficient heat absorbing surface within given over-all dimensions.

The refrigerant supply manifold has connected thereto a refrigerant delivery conduit or pipe 9 through which liquid refrigerant is delivered thereto from a condenser.

The refrigerant discharge manifold has connected thereto a refrigerant discharge conduit or pipe 10 through which vaporized refrigerant is returned to a compressor.

The evaporator is employed in a refrigerator in which it is arranged to cool the air in a cooling or refrigerating compartment.

The refrigerating apparatus with which the refrigerator is provided and of which the evaporator is a part has a condenser to supply or deliver liquid refrigerant to the evaporator and a compressor to withdraw vaporized refrigerant from the evaporator by suction and then compress this vaporized refrigerant and deliver it to the condenser to be liquefied therein.

The evaporator has the liquid refrigerant which is supplied or delivered thereto by the condenser regulated or controlled to keep the refrigerant tubes filled with liquid refrigerant to a sufficient extent to make sufficient liquid refrigerant always present and available in both the freezing tubes and the cooling tubes to absorb sufficient heat to freeze the water in the freezing compartment and cool the air in the cooling compartment at a rapid rate.

The freezing tubes will create a freezing temperature about twenty degrees Fahrenheit (20° F.) in the freezing compartment and the cooling tubes will create a cooling temperature about forty degrees Fahrenheit (40° F.) in the cooling compartment under variations in conditions causing a wide variation in the heat required to be absorbed from the cooling compartment and the freezing compartment.

The variations in the conditions causing a wide variation in the heat required to be absorbed by the evaporator from the cooling compartment and the freezing compartment are variations in the temperature outside the refrigerator, variations in the temperature and quantity of food placed in the cooling compartment, variations in the temperature and quantity of water placed in the freezing compartment, and variations in the time outside air is admitted to the refrigerator upon its door being opened to obtain access to the inside thereof.

The oil separator with which the evaporator is provided to separate oil from liquid refrigerant and return it to the compressor has a separating receiver or reservoir 11 having a depending trough 12, and the refrigerant tubes extend into the separating reservoir and communicate therewith at the upper part thereof.

The separating reservoir absorbs heat from the air in the cooling compartment in addition to that absorbed by the cooling tubes as it receives and contains liquid refrigerant and the upper warm air in the cooling compartment passes in part over its outside surface in direct contact therewith.

The separating reservoir has extending upward therein through the trough a refrigerant discharge pipe 10 communicating therewith below the refrigerant tubes and forming a combined oil overflow and vaporized refrigerant outlet 13 to discharge oil by gravity and vaporized refrigerant by suction.

The trough depending from the separating reservoir is connected to a refrigerant tube by an ascending back-flow pipe or conduit 14 communicating with the trough at the lower part thereof and the refrigerant tube below the over-flow outlet from the separating reservoir.

When the liquid refrigerant in the refrigerant tubes is being vaporized by the heat absorbed thereby, its ebullition causes liquid refrigerant with oil commingled therewith to ascend with the vaporized refrigerant into the separating reservoir and accumulate in its trough.

The liquid refrigerant which accumulates in the trough has the oil separated therefrom by flotation to the top thereof, and when the oil rises to the overflow outlet it over-flows therethrough by gravity into the discharge pipe and returns with vaporized refrigerant to the compressor.

The separating reservoir, instead of having the oil drawn or discharged therefrom by overflowing into a discharge pipe under the action of gravity, may have the oil drawn or discharged therefrom in other ways and by other means.

If the liquid refrigerant in the refrigerant tubes is below the back-flow pipe, the liquid refrigerant in the separating reservoir will be kept from rising to the over-flow outlet by returning to the refrigerant tubes through the back-flow pipe.

The back-flow pipe is restricted in size to keep sufficient liquid refrigerant in the separating reservoir to enable the oil separated therefrom to rise to the over-flow outlet.

If the refrigerant tubes are filled with liquid refrigerant to above the back-flow pipe, then the liquid refrigerant in the separating reservoir cannot be returned by the back-flow pipe to the refrigerant tubes, but the liquid refrigerant may be kept from rising to the oil over-flow outlet in other ways, as by regulating and controlling the liquid refrigerant supplied or delivered to the refrigerant tubes from the condenser.

The oil separator set forth herein may be applied to different evaporators and various modifications may be made therein without departing from the invention as hereinafter claimed.

The invention set forth in the foregoing specification is hereby claimed as follows:

1. A mechanical refrigerating evaporator, comprising a refrigerant container having liquefied refrigerant delivered thereto and vaporized refrigerant discharged therefrom, an oil separating reservoir arranged above said refrigerant container in communication therewith to contain liquid refrigerant and oil commingled therewith and receive oil from said refrigerant container and provided with an over-flow outlet arranged above the liquid refrigerant and below the vaporized refrigerant therein to discharge by gravity oil separated by flotation from the liquid refrigerant in said reservoir, and means to keep the liquid refrigerant in said reservoir from rising to said over-flow outlet.

2. A mechanical refrigerating evaporator, comprising an oil separating reservoir having an over-flow outlet arranged above the liquid refrigerant and below the vaporized refrigerant therein to discharge therefrom by gravity with vaporized refrigerant oil separated by flotation from liquid refrigerant in said reservoir, a refrigerant container depending from said reservoir and communicating therewith, means to deliver liquid refrigerant to said refrigerant container, and means to keep the liquid refrigerant in said reservoir from rising to said over-flow outlet.

3. A mechanical refrigerating evaporator, comprising a tubular liquid refrigerant container, an oil separating reservoir arranged at the top of said refrigerant container to separate oil from liquid refrigerant by flotation and having an over-flow outlet arranged above the liquid refrigerant and below the vaporized refrigerant therein to discharge by gravity with vaporized refrigerant oil floating upon the liquid refrigerant in said separating reservoir, and means to keep the liquid refrigerant in said separating reservoir from rising to said over-flow outlet.

4. A mechanical refrigerating evaporator, comprising a refrigerant container having liquid refrigerant delivered thereto from a condenser and vaporized refrigerant withdrawn therefrom and returned to a compressor, a separating reservoir arranged at the top of said refrigerant container in communication therewith to separate oil by flotation from liquid refrigerant therein and having an oil over-flow outlet arranged above the liquid refrigerant and below the vaporized refrigerant therein to discharge by gravity oil separated from the liquid refrigerant in said reservoir and rising to said over-flow outlet, a discharge pipe connected to said over-flow outlet to return said separated oil to said compressor, and means to keep the liquid refrigerant in said reservoir from rising to said over-flow outlet.

5. A mechanical refrigerating evaporator, comprising the combination with a liquid refrigerant container having liquid refrigerant delivered thereto and vaporized refrigerant discharged therefrom, of a separating reservoir arranged at the top of said container in communication therewith to receive vaporized refrigerant from said liquid refrigerant container and contain liquid refrigerant with oil commingled therewith and having an oil over-flow outlet arranged above the liquid refrigerant and below the vaporized refrigerant therein in a position to discharge therefrom by gravity oil separated by flotation from liquid refrigerant in said reservoir and over-flowing into said over-flow outlet.

6. A mechanical refrigerating evaporator, comprising the combination with a liquid refrigerant container having liquid refrigerant delivered thereto and vaporized refrigerant discharged therefrom, of a separating reservoir arranged at the top of said container in communication therewith to receive vaporized refrigerant from said liquid refrigerant container and contain liquid refrigerant with oil commingled therewith and having a vaporized refrigerant outlet and an oil over-flow outlet arranged above the liquid refrigerant and below the vaporized refrigerant therein in a position to discharge therefrom by gravity oil separated by flotation from liquid refrigerant in said reservoir and over-flowing into said over-flow outlet, and a discharge pipe connected to said oil over-flow outlet and vaporized refrigerant outlet to return separated oil and vaporized refrigerant from said reservoir to a compressor.

7. A mechanical refrigerating evaporator, comprising the combination with a liquid refrigerant container having liquid refrigerant delivered thereto and vaporized refrigerant discharged therefrom, of a separating reservoir arranged at the top of said container in communication therewith to receive vaporized refrigerant from said liquid refrigerant container and contain liquid refrigerant with oil commingled therewith and having a vaporized refrigerant outlet and an oil over-flow outlet arranged above the liquid refrigerant and below the vaporized refrigerant therein in a position to discharge therefrom by gravity oil separated by flotation from liquid refrigerant in said reservoir and over-flowing into said oil over-flow outlet, means to limit in quantity the vaporized refrigerant in said reservoir to keep it from rising to said oil over-flow outlet, and a discharge pipe connected to said oil over-flow outlet and vaporized refrigerant outlet to return separated oil and vaporized refrigerant from said reservoir to a compressor.

8. A mechanical refrigerating evaporator, comprising a refrigerant container supplied with liquid refrigerant, a separating reservoir connected to said container at the top thereof to receive vaporized refrigerant and contain oil separated by flotation from liquid refrigerant therein and having an over-flow outlet arranged above the liquid refrigerant therein in a position to allow the separated oil to over-flow therethrough by gravity, and a discharge pipe connected to said reservoir to withdraw vaporized refrigerant therefrom and return therewith to a compressor separated oil over-flowing through said over-flow outlet.

9. A mechanical refrigerating evaporator, comprising the combination with a refrigerant container provided with multiple refrigerant ducts, of a separating reservoir arranged at the top of said container in communication therewith to receive vaporized refrigerant from said liquid refrigerant container and contain liquid refrigerant with oil commingled therewith and having a vaporized refrigerant outlet and an oil over-flow outlet arranged above the liquid refrigerant and below the vaporized refrigerant therein in a position to discharge therefrom by gravity oil separated by flotation from liquid refrigerant in said reservoir and over-flowing through said over-flow outlet.

10. A mechanical refrigerating evaporator, comprising the combination with a refrigerant container provided with multiple refrigerant ducts, of a separating reservoir arranged at the top of said container in communication therewith to receive vaporized refrigerant from said liquid refrigerant container and contain liquid refrigerant with oil commingled therewith and having a vaporized refrigerant outlet and an oil over-flow outlet arranged above the liquid refrigerant and below the vaporized refrigerant therein in a position to discharge therefrom by gravity oil separated by flotation from liquid refrigerant in said reservoir and over-flowing through said over-flow outlet, means to limit in quantity the liquid refrigerant in said reservoir to keep it from rising to said oil over-flow outlet, and a discharge pipe connected to said oil over-flow outlet and said vaporized refrigerant outlet to return separated oil and vaporized refrigerant from said reservoir to a compressor.

11. A mechanical refrigerating evaporator, comprising an oil separating reservoir to accumulate the vaporized refrigerant from liquid refrigerant in the evaporator and to contain liquid refrigerant and allow the oil commingled therewith to separate therefrom by flotation to the top thereof, a liquid refrigerant container arranged below said separating reservoir to contain liquid refrigerant and absorb heat by vaporization thereof and having multiple tubes communicating at the top thereof with said separating reservoir, and means arranged to draw from said separating reservoir separated oil and vaporized refrigerant and to keep liquid refrigerant from being drawn drom said separating reservoir with the separated oil and vaporized refrigerant.

12. A mechanical refrigerating evaporator, comprising an oil separating reservoir to accumulate the vaporized refrigerant from liquid refrigerant in the evaporator and to contain liquid refrigerant and allow the oil commingled therewith to separate therefrom by flotation to the top thereof, a liquid refrigerant container arranged below said separating reservoir to contain liquid refrigerant and absorb heat by vaporization thereof and having multiple tubes communicating at the top thereof with said separating reservoid, means arranged as a part of said separating reservoir to limit in quantity the liquid refrigerant in said separating reservoir to keep it from rising above a given level therein, and means arranged to draw from said separating reservoir the separated oil and vaporized refrigerant therein and to keep liquid refrigerant from being drawn from said separating reservoir with the separated oil and vaporized refrigerant.

13. A mechanical refrigerating evaporator, comprising the combination with a refrigerant container to absorb heat by vaporization of liquid refrigerant therein, of an oil separating reservoir arranged above said refrigerant container in communication therewith to accumulate the vaporized refrigerant therefrom and to contain liquid refrigerant and allow the oil commingled therewith to separate therefrom by flotation to the top thereof and having the liquid refrigerant therein limited in quantity to keep it from rising above a given level, and means arranged to draw from said separating reservoir separated oil and vaporized refrigerant and to keep liquid refrigerant from being drawn from said separating reservoir with the separated oil and vaporized refrigerant.

14. A mechanical refrigerating evaporator, comprising the combination with a refrigerant container to absorb heat by vaporization of liquid refrigerant therein, of an oil separating reservoir arranged above said refrigerant container in communication therewith to accumulate the vaporized refrigerant therefrom and to contain liquid refrigerant and allow the oil commingled therewith to separate therefrom by flotation to the top thereof, means arranged as a part of said separating reservoir to limit in quantity the liquid refrigerant in said separating reservoir to keep it from rising above a given level therein, and means arranged to draw from said separating reservoir separated oil and vaporized refrigerant and to keep liquid refrigerant from being drawn from said separating reservoir with the separated oil and vaporized refrigerant.

15. A mechanical refrigerating evaporator, comprising the combination with a refrigerant container to absorb heat by vaporization of liquid refrigerant therein, of an oil separating reservoir arranged above said refrigerant container in communication therewith to accumulate the vaporized refrigerant therefrom and to contain liquid refrigerant and allow the oil commingled therewith to separate therefrom by flotation to the top thereof and having the liquid refrigerant therein limited in quantity to keep it from rising above a given level, and a discharge pipe arranged in communication with said separating reservoir above the level of the liquid refrigerant therein to draw therefrom separated oil and vaporized refrigerant and to keep liquid refrigerant from being drawn from said separating reservoir with the separated oil and vaporized refrigerant.

16. A mechanical refrigerating evaporator, comprising the combination with a refrigerant container to absorb heat by vaporization of liquid refrigerant therein, of an oil separating reservoir arranged above said refrigerant container in communication therewith to accumulate the vaporized refrigerant therefrom and to contain liquid refrigerant and allow the oil commingled therewith to separate therefrom by flotation to the top thereof, means arranged as a part of said separating reservoir to limit in quantity the liquid refrigerant in said separating reservoir to keep it from rising above a given level therein, and a discharge pipe in communication with said reservoir above the level of the liquid refrigerant therein to draw therefrom separated oil and vaporized refrigerant and to keep liquid refrigerant from being drawn from said separating reservoir with the separated oil and vaporized refrigerant.

In witness whereof, I have hereunto subscribed my name.

ALFRED W. MELLOWES.